US006588580B2

(12) United States Patent
Janzen (10) Patent No.: US 6,588,580 B2
(45) Date of Patent: *Jul. 8, 2003

(54) APPARATUS FOR THE TRANSPORT OF WORKPIECES IN PARTICULAR OF SUSPENDED, PANEL-SHAPED WORKPIECES

(75) Inventor: Klaus Janzen, Lünen (DE)

(73) Assignee: Neuhäuser GmbH & Co., Lunen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,519

(22) Filed: Jul. 24, 1998

(65) Prior Publication Data

US 2003/0019729 A1 Jan. 30, 2003

(30) Foreign Application Priority Data

| Jul. 24, 1997 | (DE) | ............................................ 197 31 901 |
| Jan. 27, 1998 | (DE) | ............................................ 198 02 943 |
| May 27, 1998 | (DE) | ............................................ 198 23 582 |

(51) Int. Cl.$^7$ ............................................. B65G 13/02
(52) U.S. Cl. ............................... 198/689.1; 198/690.1; 271/18.1; 271/94; 271/193; 271/197; 271/276
(58) Field of Search ................... 198/689.1, 690.1; 271/18.1, 94, 193, 197, 275, 276

(56) References Cited

U.S. PATENT DOCUMENTS

| 3,161,278 A | | 12/1964 | Buccicone | ................ 198/690.1 |
| 3,342,018 A | | 9/1967 | Temple | .................... 198/690.1 |
| 3,409,149 A | * | 11/1968 | Graux | .......................... 271/193 |
| 3,802,699 A | | 4/1974 | Wiig et al. | |
| 6,158,573 A | * | 12/2000 | Janzen | .................... 198/689.1 |

FOREIGN PATENT DOCUMENTS

| DE | 3001531 | 1/1980 |
| DE | 3423482 | 6/1984 |
| DE | 4342753 | 12/1993 |

OTHER PUBLICATIONS

German Patent Application 196 14 741 (filed Apr. 15, 1996).

German Patent Application 197 31 902.5–22 (filed Jul. 24, 1997).

German Patent Application 197 24 634.6–22 (filed Jun. 11, 1997).

* cited by examiner

Primary Examiner—Joseph E. Valenza
(74) Attorney, Agent, or Firm—Collard & Roe, P.C.

(57) ABSTRACT

The invention relates to an apparatus for the transport of workpieces (W), in particular of suspended, panel-shaped workpieces (W), such as sheets or plates. This apparatus has at least one rotationally driven conveyor belt (1, 2) for the workpieces (W) to be laid onto the latter and a holding device (3), past which the conveyor belt (1, 2) is led. The holding device (3) retains the workpieces (W) on the conveyor belt (1, 2) by means of a magnetic field passing through the latter (1, 2) and/or by generating a vacuum at suction orifices (4) of the conveyor belt (1, 2). The holding device (3) possesses at least one magnetic device (3a), with a magnetic conveyor belt (1), and at least one vacuum device (3b) separated from this and having a vacuum conveyor belt (2). The magnetic device (3a) and/or the vacuum device (3b) can be displaced with their respective conveyor belt (1, 2) relative to a common reference member (5) and can be brought into contact with the workpieces (W) to be transported.

19 Claims, 9 Drawing Sheets

APPARATUS FOR THE TRANSPORT OF WORKPIECES IN PARTICULAR OF SUSPENDED, PANEL-SHAPED WORKPIECES

The invention relates to an apparatus for the transport of workpieces, in particular of suspended, panel-shaped workpieces, such as sheets or plates, with at least one rotationally driven conveyor belt for the workpieces to be laid onto the latter, and with a holding device, past which the conveyor belt is led, the holding device retaining the workpieces on the conveyor belt by means of a magnetic field passing through the conveyor belt and/or by generating a vacuum at suction orifices of the conveyor belt.

The general procedure for conveying workpieces, in particular for the suspended transport of sheets or plates, is, after the sheet has been unwound from a coil, to cut it by means of sheet shears into panels to be further processed. These panels are delivered to a feed conveyor, from which they are received by means of the apparatus initially described. After being transported, the sheets or plates are discarded at desired locations and form stacks for packages on lifting tables. Further processing subsequently takes place, for example, in bending devices or molding presses.

An apparatus in the embodiment initially described became known from DE-C-196 14 741. The set purpose, here, was to allow suspended or supported transport or conveyance of magnetic and nonmagnetic workpieces at high speeds. To this effect, the known teaching provides a combined vacuum/magnet system (VMS) which has at least one magnet arranged adjacent to the transport band and a vacuum duct connected to a vacuum source. This vacuum duct is connected to the suction orifices of the transport band or conveyor belt via suction lines passing through the magnet. The conveyor belt, provided with ferromagnetic inserts, is guided in appropriately shaped guide strips on the magnet. Said conveyor belt is provided, on its side facing the workpieces, with a plurality of successively arranged annular elevations, on which the workpieces bear. Consequently, according to the prior art, one and the same conveyor belt is used for transporting both ferromagnetic and nonferromagnetic workpieces. Moreover, in general, both the vacuum system and the magnet system are in operation, in order to ensure that the workpieces are pressed particularly effectively onto the surface of the transport band. A vacuum is therefore employed even in the conveyance of ferromagnetic workpieces.

The known procedure or the previously published apparatus is often merely a compromise, on the one hand, as regards the ability to suck up workpieces by means of a vacuum and, on the other hand, as regards the outlay in terms of construction. Thus, in the case of the so-called flat seals used according to the prior art, problems may arise on the conveyor belt with respect to leakages which occur. Increased energy consumption for the plant as a whole is therefore to be expected in that case.

In addition, the otherwise known conveyor belts with elevations resembling suction cups (DE-A-30 01 531) are not used at this point, since elevations or suction pockets of this kind may be destroyed by steel plates which are to be transported by means of the conveyor belt.

Moreover, suction losses occur due to the fact that the known conveyor belt with a flat seal cannot readily adapt to dented or otherwise distorted sheet metal plates. Further pressure losses must therefore be expected in the region of a bulge or dent of this kind.

Irrespective of this, an apparatus, working with suction air, for the suspended transport of sheets became known from DE-A-43 42 753. This apparatus has transport bands of finite length which span the transport zone and are arranged transversely to the latter next to and parallel to one another. The transport bands can be driven via common drive and movement means, the movement drive of which is reversible for the purpose of a reciprocating movement of the transport bands and which, in the region in which the sheets are grasped, in each case have a stand-guided slidelike rigid part possessing a sucker means or are connected to such a part. An apparatus for the suspended transport even of nonmagnetizable articles is thereby to be provided.

The technical problem on which the invention is based is to develop an apparatus in the embodiment initially described, in such a way that, along with reduced energy consumption, optimum adaption to the workpieces to be transported is ensured.

To achieve this object, in a generic apparatus of the transport of workpieces, the invention proposes that the holding device have at least one magnetic device with a magnetic conveyor belt and at least one vacuum device separated from this and having a vacuum conveyor belt, the magnetic device and/or the vacuum device in each case being capable of being displaced with their respective conveyor belt relative to a common reference member and (alternately) of being brought into contact with the workpieces to be transported. Within the scope of the invention, the term "alternately" also, of course, includes the possibility of bringing both devices, that is to say the magnetic device and vacuum device, simultaneously into contact with the workpieces.

Furthermore, according to a preferred embodiment, there is provision for jointly connecting the magnetic device and the vacuum device to a profiled holding strip extending in the transport (plane) direction and acting as a reference member, the profiled holding strip having a basic carrier and a displacement carrier, and the magnetic device being flanged to the basic carrier and the vacuum device being flanged to the displacement carrier, or vice versa, said displacement carrier being movable, for this purpose, essentially vertically in relation to the transport (plane) direction. According to an alternative embodiment of the invention, there is provision for the vacuum device to be integrated into the magnetic device designed as a reference member and for said vacuum device to be movable, relative to the usually stationary magnetic device, in the direction of the workpieces. Of course, the normally stationary magnetic device may also be brought, as a whole, into contact with the workpieces, specifically as an as it were vertically adjustable holding device. It also goes without saying that the vacuum device integrated into the magnetic device may also be combined with the above-described device. In other words, within the scope of the invention, it is conceivable to have a holding device which possesses a magnetic device and vacuum device which are connected to a profiled holding strip and, in addition, a vacuum device which is integrated into the magnetic device. Furthermore, there is preferably provision for the magnetic device integrated into the vacuum device to be designed with a U-shaped cross section having a U-base and U-legs, at least two magnetic conveyor belts being led, on the foot side, past the two respective U-legs, while the vacuum device together with the vacuum conveyor belt is arranged in the longitudinal extent between the two magnetic conveyor belts.

By virtue of these measures of the invention, not only is the energy consumption markedly reduced, but, at the same time, optimum adaption to the workpieces to be transported also takes place. It should be emphasized, in this respect, that the apparatus described is suitable both for suspended and for carrying or supporting transport. At all events, it is always ensured that either the magnetic device or the vacuum device are used alternately (or else jointly).

The invention proceeds, in this case, from the current knowledge that, in general, approximately 90% of the transported workpieces are ferromagnetic, and therefore the magnetic device is used predominantly. It is consequently unnecessary to make additional provision for the workpieces to be sucked up. A simple, cost-effective toothed belt can therefore be used as a magnetic conveyor belt. There is no need for special sealing properties because, on the one hand, the magnetic device with the magnetic conveyor belt and, on the other hand, the vacuum device with the vacuum conveyor belt are designed separately. In addition, a vacuum is not required for this mode of operation, and therefore vacuum generation as a whole can be switched off via valves. Moreover, the magnetic conveyor belt can be designed particularly robustly, in order to counteract the, in particular, frictional and abrasive properties of the transported sheets or plates.

Insofar as nonferromagnetic workpieces, for example aluminum sheets, are to be transported, instead of the magnetic device with the magnetic conveyor belt the vacuum device with the vacuum conveyor belt is brought into contact with the workpieces to be transported. This vacuum device and, in particular, the vacuum conveyor belt can therefore be adapted particularly to the problems and requirements arising during vacuum suction.

Thus, the vacuum conveyor belt, usually designed as a toothed belt, is, in general, equipped with suction cups on the front side. In contrast to the prior art according to DEC-196 14 741, these bring about permanent and satisfactory suction of the workpieces to be conveyed. There need be no fear of leakages. This is because even dents or warps in the workpieces are compensated in that the suction cups can be inclined (within certain limits) and therefore adapt to the contour of the sucked-up workpiece. This is not possible with the flat seals provided in the prior art. In addition, for example when aluminum plates are being transported, damage, which is generally to be feared in the case of steel plates, does not occur. This is attributable, in particular, to the fact that aluminum is substantially softer than steel and has nowhere near the same abrasive properties. Moreover, the use of suction cups also makes it possible to suck up workpieces having surfaces which are to a greater or lesser extent soiled. This purpose is served by the internal bosses which are generally provided in the case of suction cups and which, as it were, limit the spring excursion of the suction cup and ensure that the workpiece bears satisfactorily on the latter.

As a result, due to the use of the front-side suction cups, not only is adaption to, for example, dented workpiece surfaces achieved, but even soiled sheets can be sucked up without difficulty. It must be borne in mind, in this case, that the above-mentioned suction cups, when the workpieces come to bear on them, bring about, as it were, a cleaning of the workpiece surface, so that the contact effect between the suction cup and the workpiece or workpiece surface is further improved.

At all events, overall, optimum adaption to the workpieces to be transported is achieved. Although this is at the expense of a generally higher outlay in terms of construction, as compared with the prior art, the costs as a whole are reduced, since energy consumption can be lowered considerably. Moreover, different overall lengths for the magnetic device, on the one hand, and for the vacuum device, on the other hand, can be selected. Cost savings and easy retrofitting are therefore possible. Furthermore, the drive shaft of the vacuum device can remain in the same position, this being achieved by means of a special compensating coupling in the drive head. Moreover, the coefficient of friction of the vacuum conveyor belt is not increased if a load is exerted on the vacuum conveyor belt when workpieces are being transported.

As a result, the known apparatus according to DE-A-43 42 753 operates almost exclusively in an area where unfavorable energy conditions prevail. Insofar as the teaching according to DE-C-196 14 741 is taken into account, the invention affords clear benefits, to the effect that both the vacuum conveyor belt and the magnetic conveyor belt can be adapted optimally to their respective intended uses. Compromises do not have to be reached. Normally, in an operating mode using the magnetic conveyor belt, a vacuum is usually not generated, so that vacuum generation as a whole can be switched off via valves. Of course, in the case of magnetic conveyance, vacuum action may additionally be carried out, should the weight or special nature of the workpieces make this necessary.

By integrating the vacuum device into the (stationary) magnetic device according to the statements in patent claim 7, a particularly compact embodiment having all the above-mentioned advantages is provided. Normally, in this case, and even otherwise, the vacuum conveyor belt together with the vacuum device can preferably be moved into a vacuum conveying plane which is spaced by a predetermined amount from a magnetic conveying plane defined by the magnetic conveyor belt. The vacuum conveyor belt plane and the magnetic conveying plane are usually oriented parallel to one another.

At all events, altogether, optimum adaption to the workpieces to be transported, along with low energy consumption and a compact design, is achieved. The altogether higher outlay in terms of construction, as compared with the prior art, is overcompensated, within the framework of overall cost accounting, due to the fact that, according to the invention, it was possible to lower the energy consumption considerably. Moreover, retrofittings are easily possible. In addition, due to the low mechanical load on the conveyor belts, the maintenance intervals are extended, so that further cost benefits are to be expected.

Other advantageous embodiments are listed below. Thus, the displacement carrier normally has a fastening plate for the vacuum device, said fastening plate sliding along on the basic carrier, and a bush guided vertically in a bore in the basic carrier. This ensures satisfactory vertical guidance of the displacement carrier on the basic carrier. Of course, instead of the vacuum device, the magnetic device may also be connected to the above-mentioned fastening plate. A roller of U-shaped cross section, for riding mounting on a tie rod bearing between the U-legs and on the U-base, is connected to the bush, generally coaxially, that is to say with the same axis, the tie rod being designed to be displaceable in the transport direction and having at least one run-on slope for the vertical movement of the roller and, consequently of the displacement carrier during the actuation of the tie rod. In general, a plurality of magnetic devices and vacuum devices arranged in succession in the transport direction are provided. These may be combined in respective modules, to which further reference will also be made later. The number of above-mentioned run-on slopes depends, of course, on the number of displacement carriers. At all events, altogether, by displacing the tie rod or actuating the latter it is possible to achieve a rapid changeover from magnetic operation to vacuum operation. This is attained simply by moving the displacement carrier or displacement carriers simply or synchronously with the tie rod. In this case, a changeover from "magnetic conveyance" to "vacuum conveyance" takes place in less than one second. The riding mounting of the roller on the tie rod ensures, altogether, that the latter is guided satisfactorily. Moreover, the bush guided in the bore may be designed to be mounted eccentrically, in order to allow satisfactory vertical orientation of all the fastening plates and, consequently, vacuum devices.

The magnetic device has, mainly, a hollow profiled strip with main compressed air chambers and a structural unit connected on the transport side and having at least one permanent magnet for generating a permanent magnetic field and at least one electric magnet coil or compensating coil for generating a temporary magnetic field and for compensating the permanent magnetic field. Such a structural unit is described, in principle, for example in DE-C-34 23 482. Reference is made both to this and to German patent application 197 24 634.6-22. The design of the permanent magnet and electric magnet coil is such that the (ferromagnetic) workpieces to be transported are attracted by the permanent magnet. The electric magnet coil serves for compensating this attraction and, as it were, neutralizes the permanent magnetic field and, under certain circumstances, even causes the workpiece to be repelled.

The hollow profiled strip and the above-mentioned structural unit possess, in general, recesses for teeth of the adjacently rotating magnetic conveyor belt. This applies, of course, only when this magnetic conveyor belt is designed as a toothed belt, which is usually the case. The vacuum device has a compressed air guide strip with secondary compressed air chambers and at least one vacuum source with a vacuum generator or vacuum generators, the vacuum source being connected on the delivery side to the compressed air guide strip and on the suction side to the suction orifices. The secondary compressed air chambers are connected to the main compressed air chambers of the magnetic device and are supplied with compressed air by these.

The compressed air guide strip preferably possesses one or more, usually three, secondary compressed air chambers. The vacuum generator is, in general, a Venturi nozzle with a connected vacuum line which is connected to the suction orifices. The procedure may, of course, also be such that, in the vacuum device as a whole, vacuum pumps, blow-up pumps, etc. for a vacuum to act centrally on the suction orifices are provided instead of a Venturi nozzle. However, the advantage of Venturi nozzles is that they make it possible to implement rapid switching frequencies, and, consequently, spot-on discarding and sucking-up of the workpieces to be transported are achieved at a high transport speed. Moreover, Venturi nozzles generally have a sound-insulating effect, particularly where low-frequency sound is concerned.

By using a central permanent magnet and at least one compensating coil surrounding the permanent magnet in the magnetic device, the permanent magnetic field can, as it were, be forced back out of a working gap between the magnetic device and workpieces (with the aid of the compensating coil). Workpieces previously retained magnetically can thereby be discarded at the desired location without difficulty and so as to be aimed at the exact spot. In the case of a vacuum device, discard aimed at the exact spot takes place by corresponding pressure action (instead of the usual suction), as explained in more detail below.

Insofar as the magnetic device is designed with a double-U-shaped cross section having an outer U-armature and an outer armature base and outer armature legs and with an inner U-armature with an inner armature base and inner armature legs, the permanent magnet is conventionally arranged between the two armature bases, the compensating coil being placed in each case between inner and outer armature legs.

In order to move the vacuum conveyor belt or vacuum device into the vacuum conveying plane, the vacuum device normally has a connected adjusting device for essentially vertical movement in the direction of the workpieces and back again. This adjusting device (normally used when the vacuum device is integrated into the magnetic device) is, in general, connected to a guide body or the vacuum device on the head side and to the inner armature base or the magnetic device on the foot side.

In order to act on the suction orifices of the vacuum conveyor belt, the vacuum device may have, in cross section, a guide body with suction bores for the above-mentioned suction orifices in the vacuum conveyor belt. In this case, the suction bores and the suction orifices are normally arranged concentrically on a central axis of the vacuum device. During the rotation of the vacuum conveyor belt, the suction orifices preferably in each case move on a plane of longitudinal extent of a vacuum duct which is connected to the suction bores on the transport side for connecting these to one another. Consequently, within the scope of the invention, it is always ensured that, on the one hand, the suction orifices are continuously in alignment with the vacuum duct and, on the other hand, have maximum overlap with the suction bores when they are led past. Pressure fluctuations are accordingly avoided.

So that the movements of the (integrated) vacuum device together with the vacuum conveyor belt can be compensated in relation to the (stationary) magnetic device, a suction line led laterally past the magnetic device is generally connected to the suction bore in the guide body with movement play. In contrast to the teaching according to DE-C-196 14 741, due to the magnetic device and vacuum device being designed separately, there is no need for the magnetic device to pass through. This should be emphasized expressly. In the simplest case, the suction line may be a flexible hose, but also concentric cubes which engage telescopically one in the other and which are moved one out of the other when the vacuum device is thrown against the workpieces and are inserted one into the other when said device is guided back.

The vacuum conveyor belt may engage, with rear sealing lips, into sealing gaps forming between centering jaws of the central guide body which are located on both sides. For this purpose, the guide body is conventionally designed symmetrically in relation to the already above-mentioned central axis (of the vacuum device) and has centering jaws located on both sides, so as to form an essentially U-shaped cross-sectional profile.

A particularly compact embodiment with regard to the vacuum device integrated into the magnetic device is defined in that the guide body together with the centering jaws has a transverse extent adapted to the width of the vacuum conveyor belt, the guide body, centering jaws and vacuum conveyor belt being inserted with lateral play into the inner U-armature. According to a preferred embodiment of the invention, the vacuum conveyor belt is normally one such as is described in German patent application 197 31 902.5-22, to which express reference is made.

Furthermore, the procedure is, in general, such that the vacuum device has two valves, each with two positions, one valve being designed for applying pressure to the vacuum source, and the other valve, bypassing the vacuum source, being designed for applying pressure to the suction orifices. Idle times between sucking up and discarding the transported workpiece are thereby successfully avoided. This is because, while one valve is still being opened in order to apply pressure to the vacuum source, and consequently the vacuum source acts with a vacuum on the suction orifices on the suction side, the other valve bridging the vacuum source can already be opened. Accordingly, a seamless transition from suction to repulsion (by means of the excess pressure built up by the bridging valve) can be implemented. This is of considerable importance, particularly in view of the short cycle times which are customary nowadays.

Finally, according to a further proposal of the invention, there is provision for connecting the vacuum duct in the plane of longitudinal extent or longitudinal plane, in individual sections each with two or more suction bores with connected suction lines, to a vacuum source in each case, so as to form respective suction modules. In this case, at least one vacuum limiting valve (VBV), vacuum-switched parallel to the suction bores or suction lines, is usually provided. In order to limit the vacuum, this vacuum limiting valve conventionally opens at a predetermined vacuum threshold value in the vacuum duct or the suction lines or in the vacuum line. In particular, for this purpose, there is preferably provision for the vacuum limiting valve to have a vacuum chamber which is connected to the suction lines or to the common vacuum line and which, spring-assisted, is shut off relative to atmospheric pressure by means of a valve disk connected to a valve tappet and closing an air inlet orifice.

The invention thereby takes account of the fact that, with an increasing number of closed suction orifices or suction cups of the vacuum conveyor belt, the vacuum occurring in the vacuum duct or the vacuum system as a whole rises to unacceptable values. The result of this is that the vacuum conveyor belt is ultimately sucked onto the vacuum device and in this case, in particular, the guide body. The friction between the guide body and vacuum conveyor belt is thereby increased, to such an extent that operating impairments, at the very least sluggish running of the vacuum conveyor belt, are to be feared. Moreover, the energy consumption for driving the vacuum conveyor belt thereby rises disproportionately.

These problems are countered, according to the invention, by the vacuum limiting valve (VBV) which is switched parallel to the suction lines or the common vacuum line and, consequently, to the vacuum source. Ultimately, it is important merely to provide this vacuum limiting valve at any location in the vacuum system. This is because this valve ensures, as a result, that, beyond a specific vacuum threshold value in the vacuum duct, the connected suction bores and the suction lines or the common vacuum line, supply air can enter the above-mentioned system. This takes place in such a way that, beyond a specific vacuum, the valve disk is lifted off from the supply air orifice counter to a spring force, so that outside air or supply air can penetrate into the vacuum chamber. Consequently, the vacuum in the vacuum duct, the suction lines, the common vacuum line and, of course, also in the suction bores leading to the suction orifices and in the suction cups in the vacuum conveyor belt decreases, with the result that the vacuum conveyor belt is sucked up to a lesser extent. The friction between the vacuum conveyor belt and guide body simultaneously decreases.

In conclusion, the drive power of the vacuum conveyor belt can be reduced considerably. Moreover, by appropriately setting the vacuum limiting valve, a constant and, at the same time, variably adjustable suction force may be employed. In this way, wear between the conveyor belt and guide body decreases and the transport of sucked-up workpieces, in particular sheets or plates, becomes altogether free of jolts. Quiet running of all movable parts is achieved at the same time. By working with a reduced suction vacuum, satisfactory and uniform release of the workpieces transported in suspension on the vacuum conveyor belt is obtained. Moreover, the time constant for sucking up and/or discarding sheets or plates is extremely short. As a result of this, the transport speeds can be increased and the cycle times reduced. This allows an altogether higher throughput of transported workpieces, as compared with an apparatus without a vacuum limiting valve. Finally, the reduction in drive power is accompanied by lower energy consumption and, furthermore, the noise level is markedly lowered. This is plainly and simply because, due to the reduced pressures (sucking up and discarding pressure), the associated noises are also reduced. Furthermore, an indirect effect which emerges is that the frictional forces between the vacuum conveyor belt and guide body are reduced, thus minimizing frictional and, possibly, blockage noises.

The invention is explained in more detail below with reference to a drawing which illustrates only one exemplary embodiment and in which.

The figures show an apparatus for the transport of workpieces W, in particular of suspended, panel-like workpieces W, such as sheets or plates. This apparatus has, in its basic design, at least one rotationally driven conveyor belt 1, 2 for the workpieces W to be laid onto it. In addition, a holding device 3, past which the conveyor belt 1, 2 is led, is implemented. The holding device 3 retains the workpieces W on the conveyor belt 1, 2 by means of a magnetic field (see the dotted and dashed magnetic field lines in FIG. 4) passing through the conveyor belt 1, 2 and/or by generating a vacuum at suction orifices 4 of the conveyor belt 1, 2.

Figure 1:
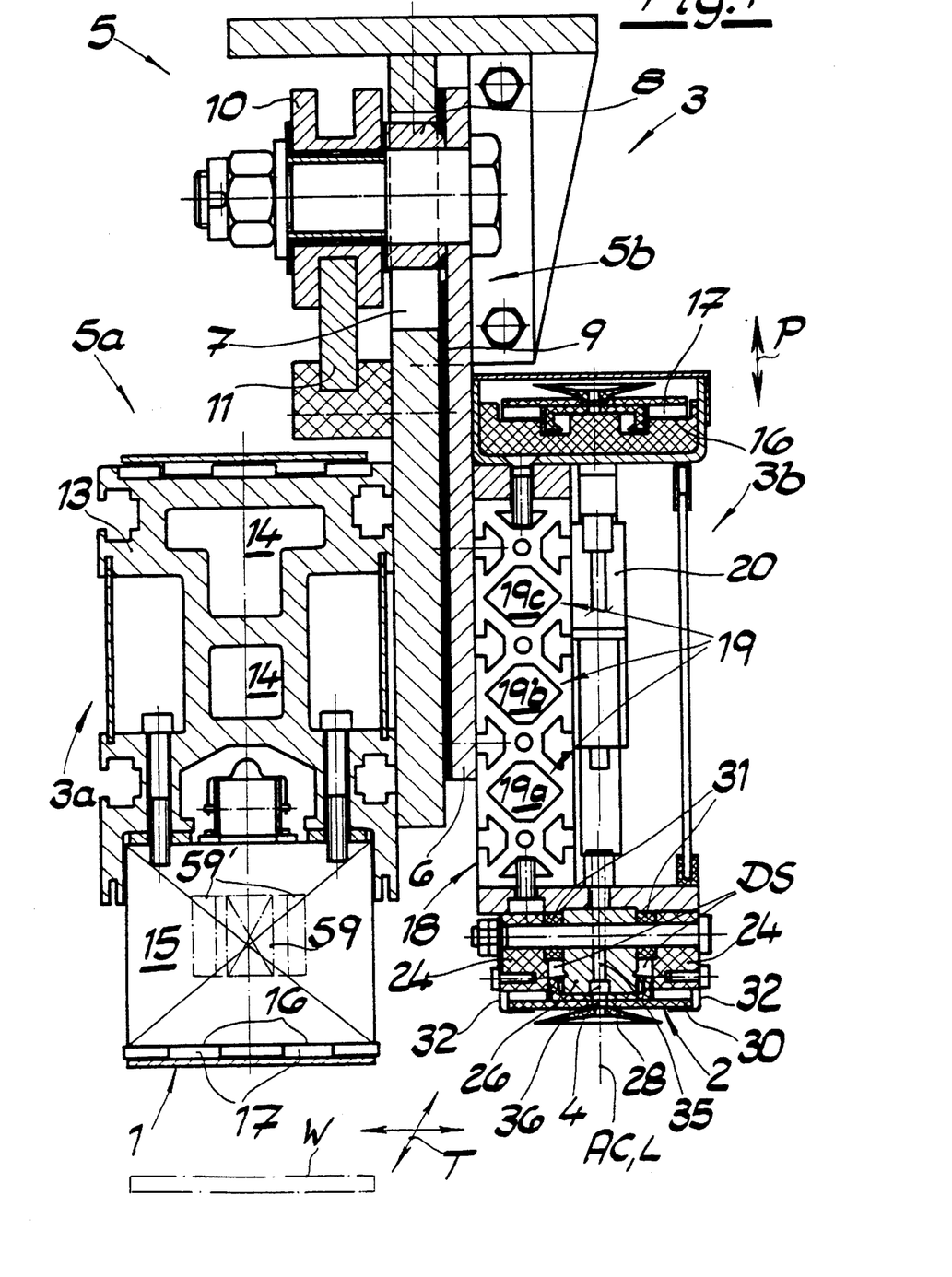
FIG. 1 shows an apparatus according to the invention with a profiled holding strip as a reference member, illustrated in the case where (ferromagnetic) workpieces W are transported by means of the magnetic device together with the magnetic conveyor belt.
Figure 2:
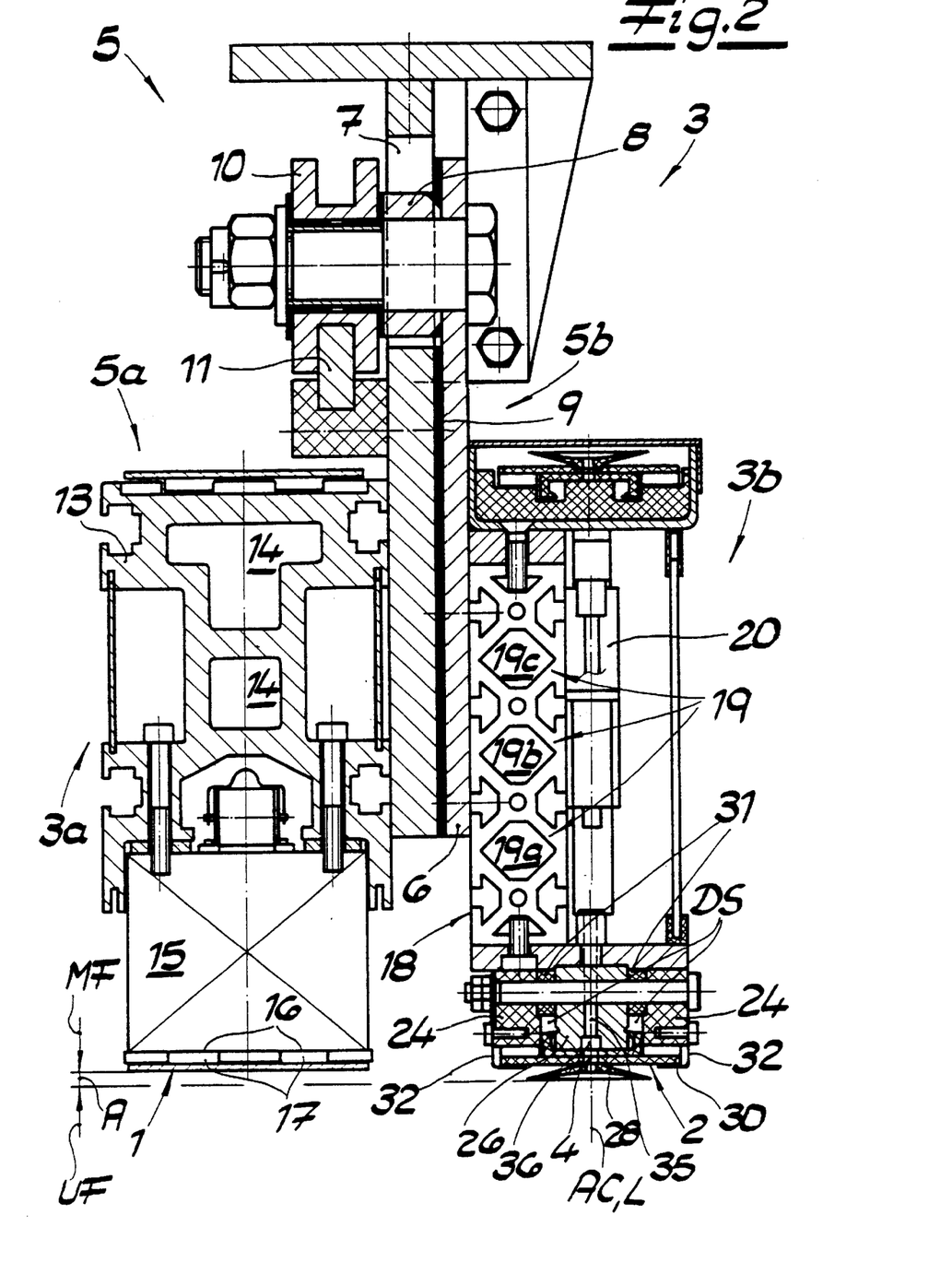
FIG. 2 shows the same apparatus in the case of transport by means of the vacuum device together with the vacuum conveyor belt.
Figure 3A:
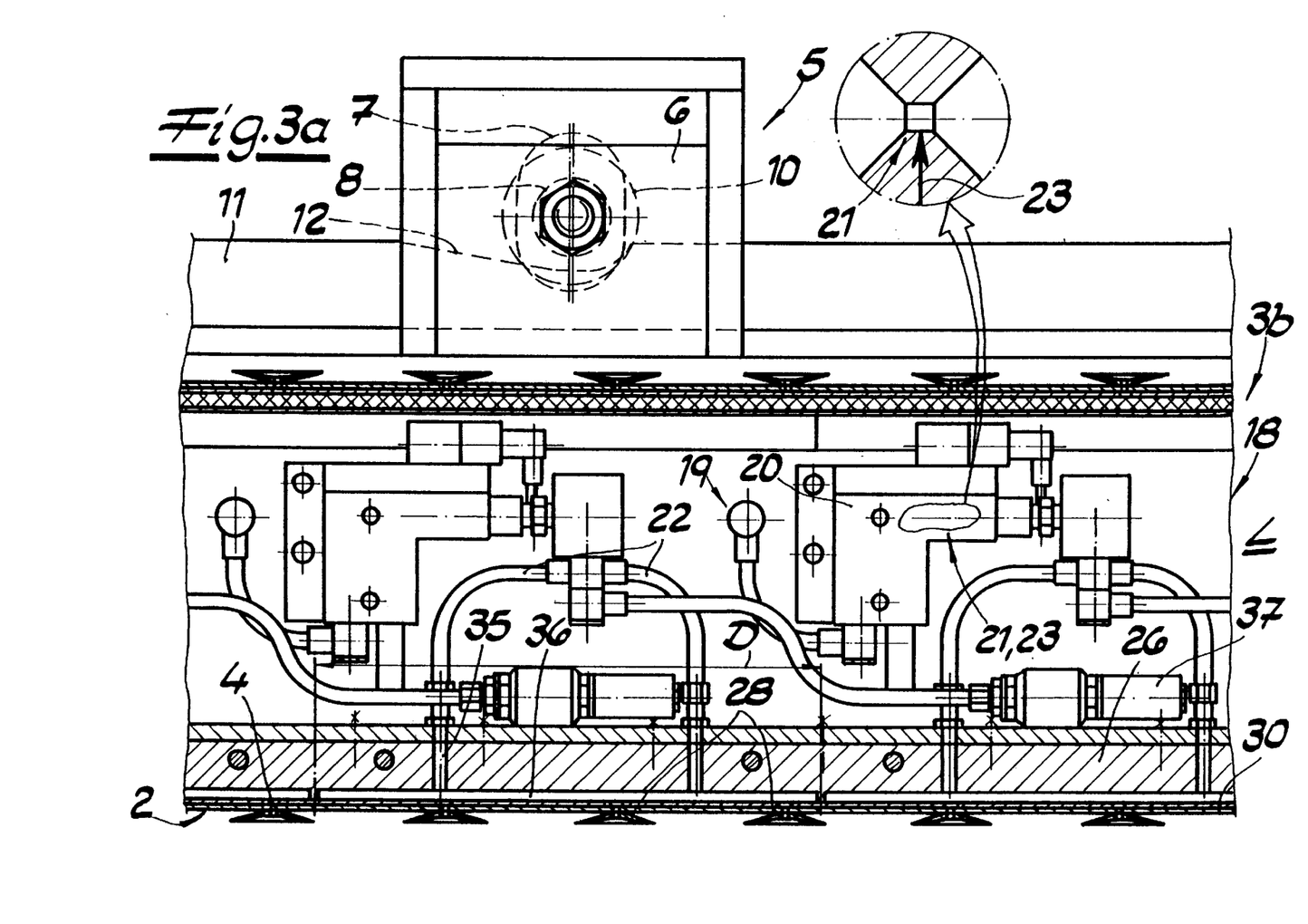
FIGS. 3a and 3b show a partially sectional side view of the apparatus according to FIGS. 1 and 2, FIG. 3a showing an embodiment without a vacuum limiting valve and FIG. 3b one with a vacuum limiting valve.
Figure 3B:
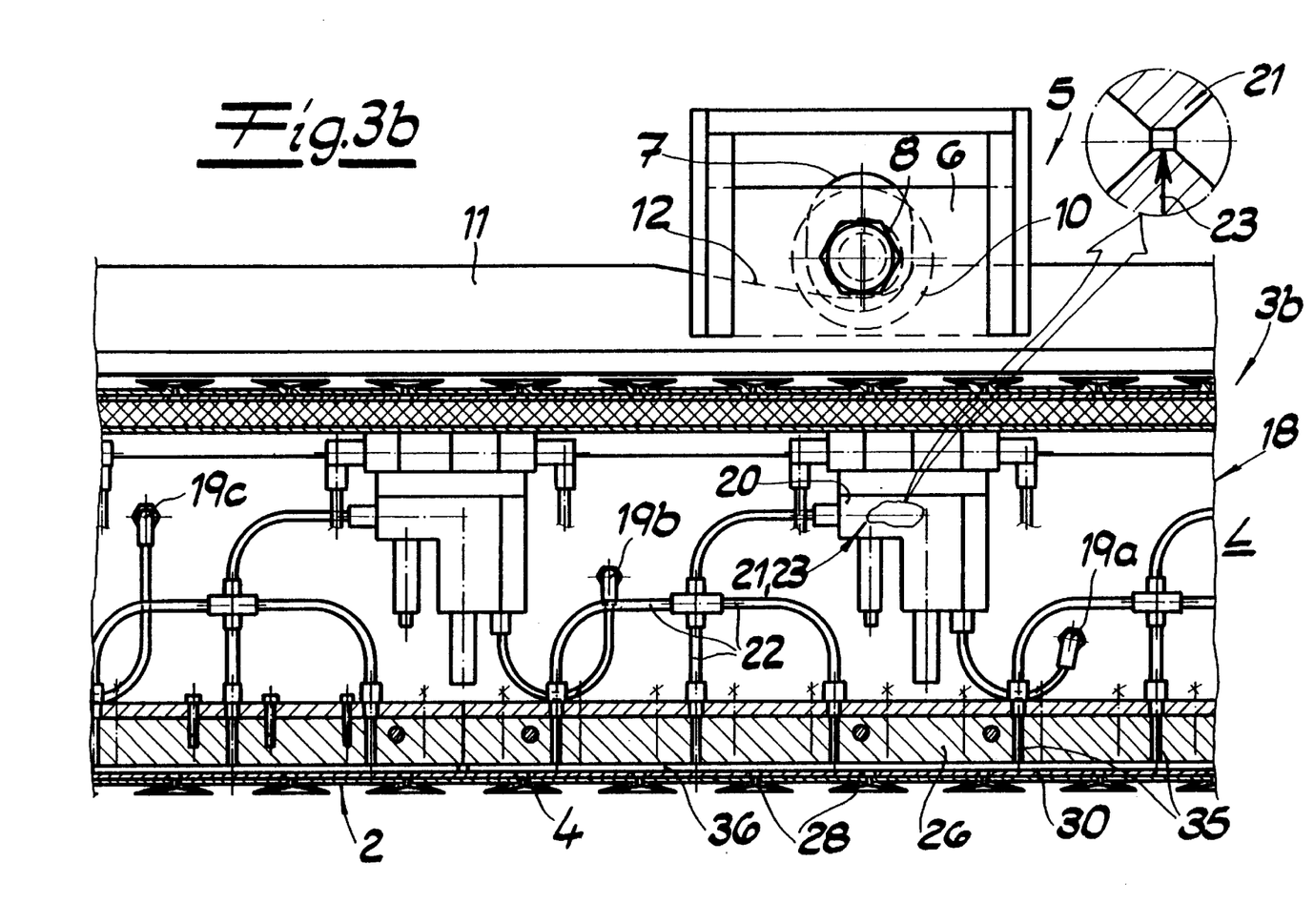

In the exemplary embodiment according to FIGS. 1 to 3, two conveyor belts 1, 2 are implemented, namely a magnetic conveyor belt 1 and a vacuum conveyor belt 2. In the alternative embodiment according to FIGS. 4 and 5, two magnetic conveyor belts 1 and one vacuum conveyor belt 2 are illustrated. In the present case, the vacuum conveyor belt 2 shown there belongs to a vacuum device 3b integrated into the magnetic device 3a. This vacuum device 3b can be moved, together with the vacuum conveyor belt 2, relative to the (stationary) magnetic device 3a in the direction of the workpieces W. For this purpose, the vacuum conveyor belt 2, together with the vacuum device 3b, can be thrown into a vacuum conveying plane UF against the workpieces W, this vacuum conveying plane UF being spaced by a predetermined amount A from a magnetic conveying plane MF defined by the magnetic conveyor belts 1 (see FIG. 4). In this case, the above-mentioned amount A or the distance A between the vacuum conveying plane UF and the magnetic conveying plane MF conventionally depends on the structural circumstances and on the nature of the workpieces W. From the evidence of FIG. 4, the vacuum conveying plane UF is normally located below the magnetic conveying plane MF, the vacuum device 3b being placed, in the position of rest, within the magnetic device 3a above the magnetic conveying plane MF, specifically at a distance C from this magnetic conveying plane MF. At all events, the vacuum conveyor belt 2 and, together with it, the vacuum device 3b can be correspondingly arranged in relation to the magnetic conveying plane MF either above and/or below the latter, the alternative "and" representing the possibility of providing two or more vacuum devices 3b together with vacuum conveyor belts 2. FIGS. 1 and 2 illustrate comparable possibilities for the adjustment of the vacuum device 3b.

Figure 4:
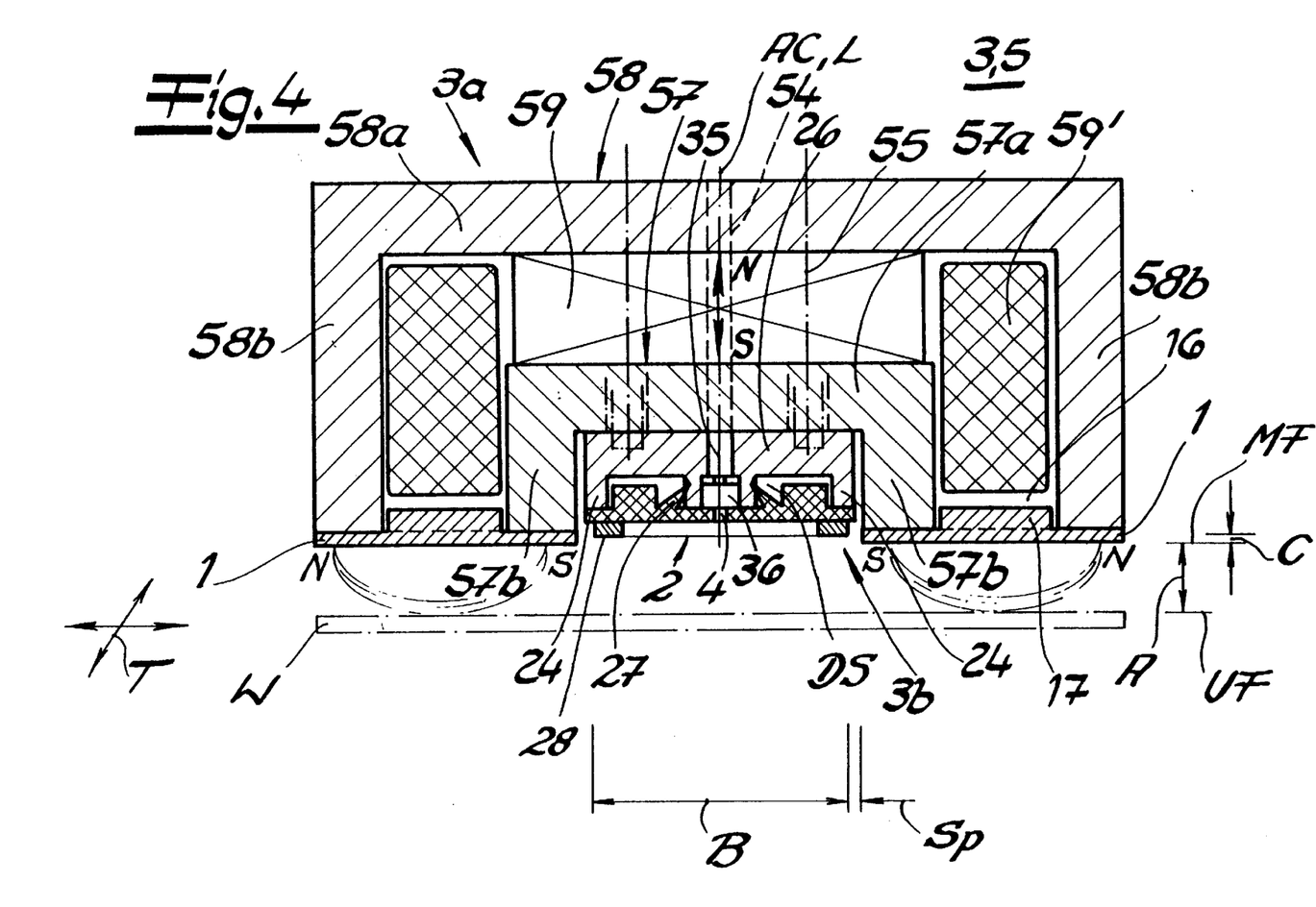
FIG. 4 shows another embodiment of the invention with the vacuum device integrated into the magnetic device.
Figure 5:
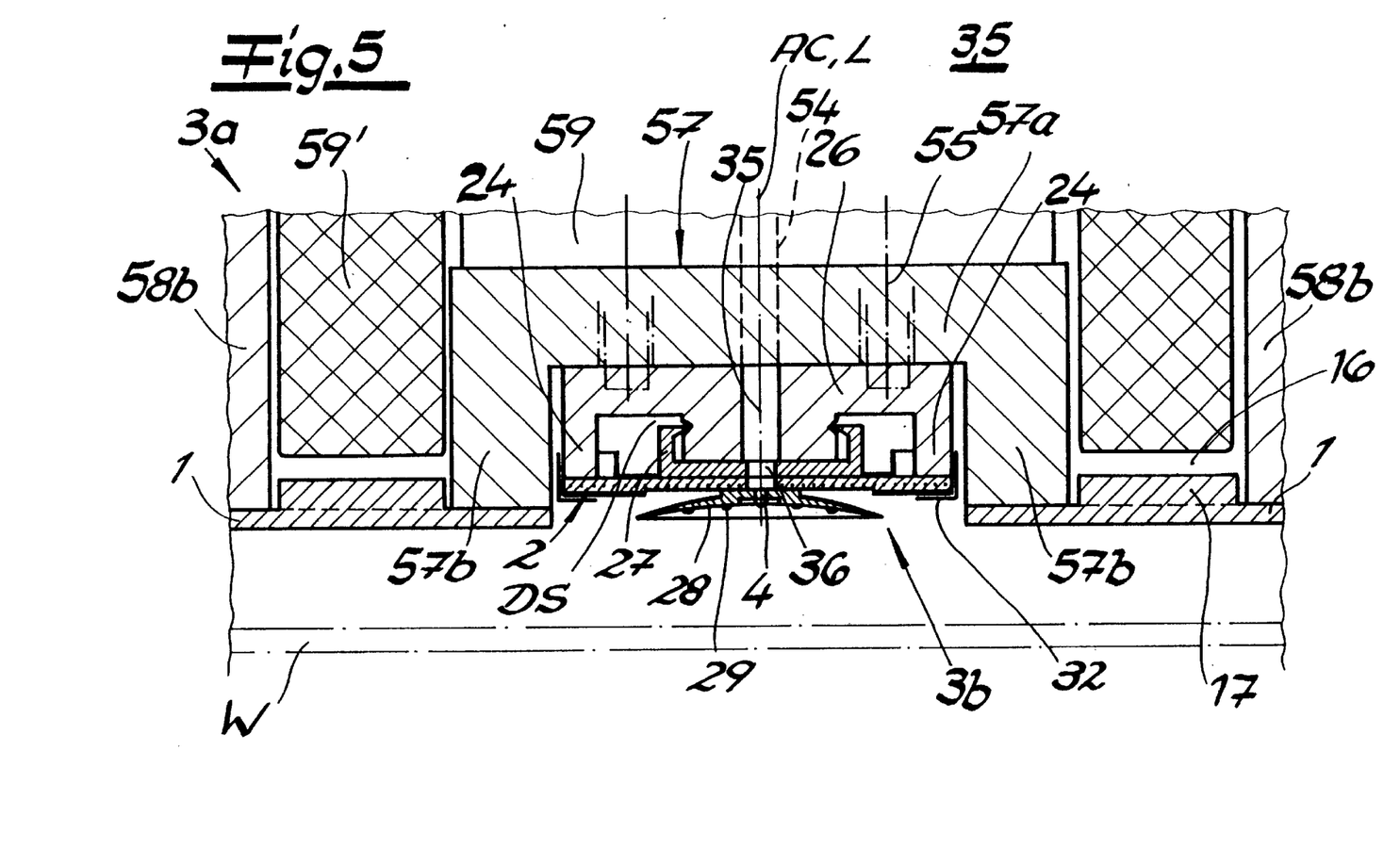
FIG. 5 shows a modification of the embodiment according to FIG. 4.

In the exemplary embodiment according to FIGS. 4 and 5, an adjusting device 55, merely indicated, which is connected to the vacuum device 3b serves for corresponding adjustment. This adjusting device 55 may be one or more cylinder/piston units which are arranged along the longitudinal extent and which move the vacuum device 3b essentially vertically in the direction of the workpieces W and back again and are arranged, in cross section, on both sides of a suction line 54. The above-mentioned adjusting device 55 is connected on the head side to a guide body 26 and on the foot side to the magnetic device 3a or to an inner armature base 57a which is to be explained in more detail below.

At all events, the holding device 3 always has at least one magnetic device 3a with a magnetic conveyor belt 1 and at least one vacuum device 3b with a vacuum conveyor belt 2, said vacuum device being separated from said magnetic device. Conventionally, a plurality of magnetic devices 3a and/or vacuum devices 3b are arranged in succession along the longitudinal extent of the holding device 3, that is to say in the transport (plane) direction T. As described, the magnetic device 3a and/or the vacuum device 3b can in each case be displaced, together with their respective conveyor belt 1, 2, in relation to a common reference member 5 and be brought into contact with the workpieces W to be transported. According to the exemplary embodiment in FIGS. 4 and 5, the reference member 5 is the magnetic device 3a. By contrast, the apparatus illustrated in FIGS. 1 to 3 has a profiled holding strip 5 as a reference member 5. It is always ensured that the respective magnetic device 3a and the respective vacuum device 3b can be brought alternately with their respective conveyor belt 1, 2 into contact with the workpieces to be transported. Simultaneous bearing contact is, of course, also possible.

For this purpose, from the evidence of FIGS. 1 to 3, the already mentioned profiled holding strip 5 extending in the transport (plane) direction and having a basic carrier 5a and a displacement carrier 5b is provided. In this case, the magnetic device 3a is flanged to the basic carrier 5a and the vacuum device 3b is flanged to the displacement carrier 5b which, for this purpose, is movable essentially vertically in relation to the transport (plane) direction T. The opposite may, of course, also take place. The direction of movement of the displacement carrier 5b is indicated by an arrow P in FIGS. 1 and 2.

The displacement carrier 5b has a fastening plate 6 for the vacuum device 3b, said fastening plate sliding along on the basic carrier 5a, and a bush 8 guided vertically in a bore 7 in the basic carrier 5a. In order to reduce the friction between the fastening plate 6 and basic carrier 5a, an interposed brass plate 9 is provided. A roller 10 of U-shaped cross section, for riding mounting on a tie rod 11 bearing between the U-legs and on the U-base, is connected coaxially to the bush 8, the tie rod 11 being designed to be displaceable in the transport (plane) direction T and having at least one run-on slope 12 for the vertical movement of the roller 10 and, consequently, of the displacement carrier 5b during the actuation of the tie rod 11. This becomes clear, in particular, from a comparison of FIGS. 1 and 2 with FIG. 3 (that is to say, FIG. 3a or 3b). As soon as the tie rod 11 is actuated, the U-shaped roller 10 runs up or down on the run-on slope 12, this being associated with a corresponding vertical movement of the displacement carrier 5b. In this way, the displacement carrier and, consequently, the vacuum device 3b can be moved away from the workpieces W (see FIG. 1) or is thrown onto the workpieces W (see FIG. 2).

The first-mentioned case is the operating mode which is the most frequently implemented, since approximately 90% of the workpieces to be transported are ferromagnetic and therefore are transported solely by means of the magnetic device 3a. This magnetic device 3a has a hollow profiled strip 13 with main compressed air chambers 14 and a structural unit 15 connected on the transport side and having at least one permanent magnet 59 for generating a permanent magnetic field and at least one electric magnet coil or compensating coil 59' for generating a temporary magnetic field and for compensating the permanent magnetic field. Electromagnets are, of course, also conceivable instead of the permanent magnet 59. A comparable procedure is adopted in the exemplary embodiment according to FIGS. 4 and 5. The hollow profiled strip 13 and the structural unit 15 possess in each case recesses 16 for teeth 17 of the adjacent, rotating magnetic conveyor belt 1 (see also FIGS. 4 and 5).

From the evidence of FIGS. 1 to 3, the vacuum device 3b possesses a compressed air guide strip 18 with secondary compressed air chambers 19 and at least one vacuum source 20 with a vacuum generator or vacuum generators 21. In detail, the vacuum source 20 is connected on the delivery side to the compressed air guide strip 18 or another pressure source and on the suction side to the suction orifices 4 of the vacuum conveyor belt 2. According to the exemplary embodiment in FIGS. 1 to 3, in each case two (FIG. 3a) or three (FIG. 3b) suction lines 22 are connected on the suction side of the vacuum source 20. The compressed air guide strip 18 possesses one or more, in the exemplary embodiment three, secondary compressed air chambers 19a, 19b and 19c. As emerges, in particular, from FIG. 3b, the vacuum sources 20 are alternately connected to the secondary compressed air chambers 19a, 19b and 19c, in each case in succession in the transport direction T. Pressure breakdowns in the compressed air supply system as a whole are thereby avoided. The latter consists, as a whole, of the main compressed air chambers 14 to which compressed air is applied and which feed the compressed air guide strip 18 and, consequently, the secondary compressed air chambers 19a, 19b and 19c via supply lines (not shown). From the evidence of the enlarged detail in FIGS. 3a and 3b, the vacuum generator 21 is a Venturi nozzle 21 with a connected vacuum line 23 which is connected to the above-mentioned suction lines 22 and, consequently, to the suction orifices 4 (see also FIG. 8).

Figure 7:
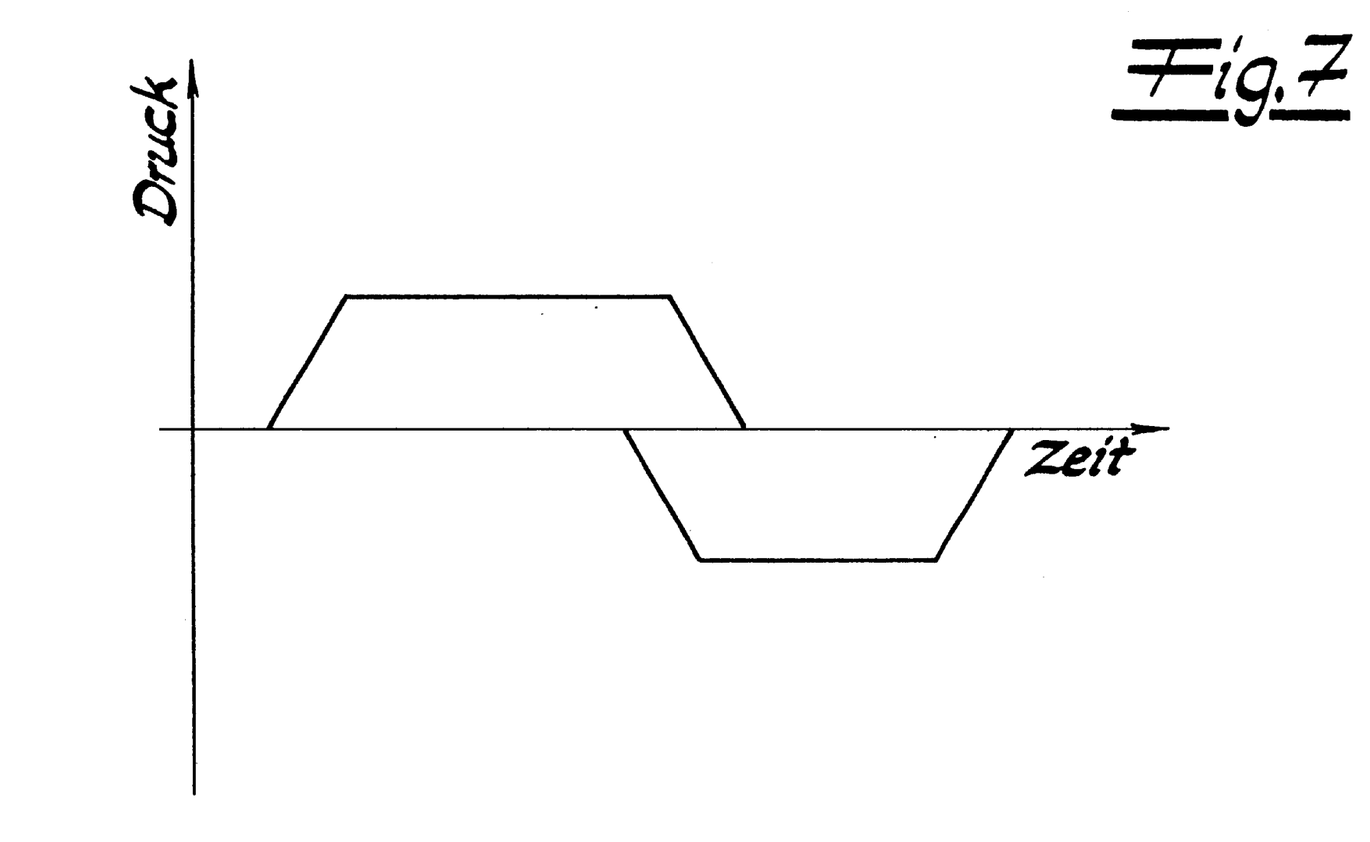
FIG. 7 shows a time diagram which documents the basic pressure buildup of reduction at the suction orifices of the vacuum conveyor belt.

Furthermore, the vacuum device 3b possesses two valves (not shown) which in each case can assume two positions. One valve serves for applying pressure to the vacuum source 20, while the other valve, bypassing the vacuum source 20, is provided for applying pressure directly to the suction orifices 4. Consequently, by means of the vacuum source 20, pressure profiles, as shown in FIG. 7, can be produced at the suction orifices 4.

The vacuum device 3b has, in cross section, a guide body 26 arranged between at least two mutually opposite centering jaws 24, in each case with a sealing gap DS, the vacuum conveyor belt 2 engaging, with rear sealing lips 27, into the sealing gaps DS and retaining the workpieces by means of front-side suction cups 28. The centering jaws 24 consist of ultrahigh-molecular low-pressure polyethylene (PE-UHMW). According to the exemplary embodiment, the vacuum conveyor belt 2 is a toothed belt. In this case, as in the case of the magnetic device 3a, recesses 16 for corresponding teeth 17 of the vacuum conveyor belt 2 are also provided on the vacuum device 3b. Furthermore, the suction cups 28 have internal bosses 29 which limit the spring excursion of the suction cups 28 and which serve for the bearing contact of the workpieces W. The guide body 26 consists of steel with a sintered-on sliding coating. This coating is molybendum disulfide ($MoS_2$).

The vacuum conveyor belt 2 has throughout a Shore hardness of approximately 90, while the sealing lips 27 and suction cups 28 as well as the bosses 29 have Shore hardnesses of approximately 55. Said belt consists, as a whole, of three parts, namely the sealing lips 27, the suction cups 28 with bosses 29 and a belt body 30. In this case, the sealing lips 27 and suction cups 28 are welded onto the belt body 30. Altogether, the vacuum conveyor belt 2 is manufactured from PUR (polyurethane) and has a PA (polyamide) coating 2' in the region of a contact face with the guide body 26 or flanged-on angles 32. Coefficients of friction of approximately 0.2, as compared with 0.5 without a coating (that is to say, PUR on steel), are thereby achieved (see FIG. 6).

Foam centering bodies 31, capable of being compressed elastically so as to set the respective sealing gap DS, are provided on both sides of the guide body 26, in cross section between the guide body 26 and the respective centering jaw 24, for the centric retention of the guide body 26 between the centering jaws 24. There are, in addition, the angles 32 which are flanged to the centering jaws 24 on the outside and which engage under the centering jaws 24 on the transport side, while at the same time guiding the vacuum conveyor belt 2 which bears on the centering jaws 24. This ensures not only guidance, but, at the same time, also protection of the vacuum conveyor belt 2 (see FIGS. 1 and 2).

The vacuum conveyor belt 2 possesses in cross section, on its rear side, two mutually opposite sealing lips 27, in each case with inwardly directed sealing teeth 33. 3, 4, or more sealing lips 27 may, of course, also be provided. The sealing lips 27 are arranged diametrically opposite one another in relation to the suction orifices 4 arranged between them. The guide body 26 has chamfers 34 which correspond to the sealing teeth 33 and which are intended for said sealing teeth 33 when the latter engage therein. Each sealing tooth 33 possesses two tooth edges 33a, 33b which are designed as a sealing edge 33a and closing edge 33b and which form between them an acute angle $\alpha$, the sealing edge 33a bearing on a sealing chamfer edge 34a of the chamfer 34 at a predetermined angle $\beta$ in relation to the transport (plane) direction T, usually the horizontal, and the sealing chamfer edge 34a likewise being at a predetermined inclination $\gamma$ relative to the transport (plane) direction T. These geometric relations are shown, in connection with the above-mentioned angles $\alpha$, $\beta$ and $\gamma$, in the enlarged detail in FIG. 6. The angles $\alpha$ and $\beta$ amount in the position of rest, that is to say in the prestressed position (represented by dashed lines in FIG. 6), prior to installation, to approximately 20° to approximately 60°. The angle $\gamma$ moves in the range of between approximately 30° and 80°. According to the exemplary embodiment, $\alpha \approx \beta \approx 30°$ and $\gamma \approx 50°$. The aperture angle 6 of the chamfer 34 is approximately 90° to 120°. The angle of inclination $\epsilon$, which represents, as it were, the prestress, is in the range of between approximately 85° and 95°. The angle, not specified in any more detail, between the sealing edge 33a and sealing chamfer edge 34a is approximately 15° to 30°.

Finally, the guide body 26 possesses suction bores 35 for the centric suction orifices 4 in the vacuum conveyor belt 2, and, due to the centric retention of the guide body 26 and to the corresponding guidance of the vacuum conveyor belt 2, the suction bores 35 and suction orifices 4 are in each case arranged, in cross section, concentrically on a central axis AC of the vacuum device 3b, while, during the rotation of the vacuum conveyor belt 2, the suction orifices 4 move in each case on a plane of longitudinal extent L of a vacuum duct 36 which is connected to the suction bores 35 on the transport side for the purpose of connecting these to one another (see, in particular, FIGS. 1, 2 and 4, 5).

According to the exemplary embodiment, the central axis AC of the vacuum device 3b and the plane of longitudinal extent L of the vacuum duct 36 coincide. Owing to the self-centering effect of the vacuum conveyor belt 2, the sealing teeth 33 are pivoted out of the position represented by dashed lines and shown in FIG. 6, so that the sealing edge 33a mates closely with the sealing chamfer edge 34a over a large bearing contact area. At the same time, the vacuum conveyor belt 2 as a whole is laid closely onto the guide body 26 as a result of the elastic return forces of the (elastomeric) material used. As a result, reliable sealing off of the vacuum duct 36 is thereby achieved.

According to the exemplary embodiment in FIGS. 4 and 5, the magnetic device 3a is designed with a U-shaped cross section having a U-base and U-legs, the two magnetic conveyor belts 1 being led, on the foot side, past the two respective U-legs, while the vacuum device 3b together with the vacuum conveyor belt 2 is arranged along the longitudinal extent between the two magnetic conveyor belts 1. Furthermore, the magnetic device 3a has a central permanent magnet 59 and at least one compensating coil 59' surrounding the permanent magnet 59. In detail, the arrangement is such that the magnetic device 3a is designed with a double-U-shaped cross section with an outer U-armature 58 and an inner U-armature 57. Both the outer U-armature 58 and the inner U-armature 57 have in each case an armature base 57a, 58a and armature legs 57b, 58b. Reference will accordingly be made below to the outer armature base 58a, the inner armature base 57a, the outer armature legs 58b and, finally, the inner armature legs 57b.

As already described, the vacuum device 3b possesses, in cross section, the guide body 26 mentioned, with suction bores 35 for the suction orifices 4 in the vacuum conveyor belt 2. Suction bores 35 and suction orifices 4 are in each case arranged concentrically on the central axis AC of the vacuum device, said central axis at the same time being the central axis of the magnetic device 3a. During the rotation of the vacuum conveyor belt 2, the suction orifices 4 in each case move on the plane of longitudinal extent L of the vacuum duct 36 which is connected to the suction bores 35 on the transport side for connecting these to one another. According to the exemplary embodiment, the central axis AC lies in the plane of longitudinal extent L, that is to say the central axis plane or central axis AC, and the plane of longitudinal extent L coincide.

The guide body 26 is designed symmetrically in relation to the central axis AC or to the plane of longitudinal extent L and has centering jaws 24 integrally formed on both sides. The guide body 26 and centering jaws 24 form an essentially U-shaped cross-sectional profile. The vacuum conveyor belt 2 engages, with the rear sealing lips 27, into the sealing gaps DS forming between the centering jaws 24 located on both sides and the central guide body 26. In this case, the procedure in detail is as described in DE-C196 14 741 (see FIG. 4) or in German patent application 197 31 902 (see FIG. 5), to which express reference is made.

Figure 6:
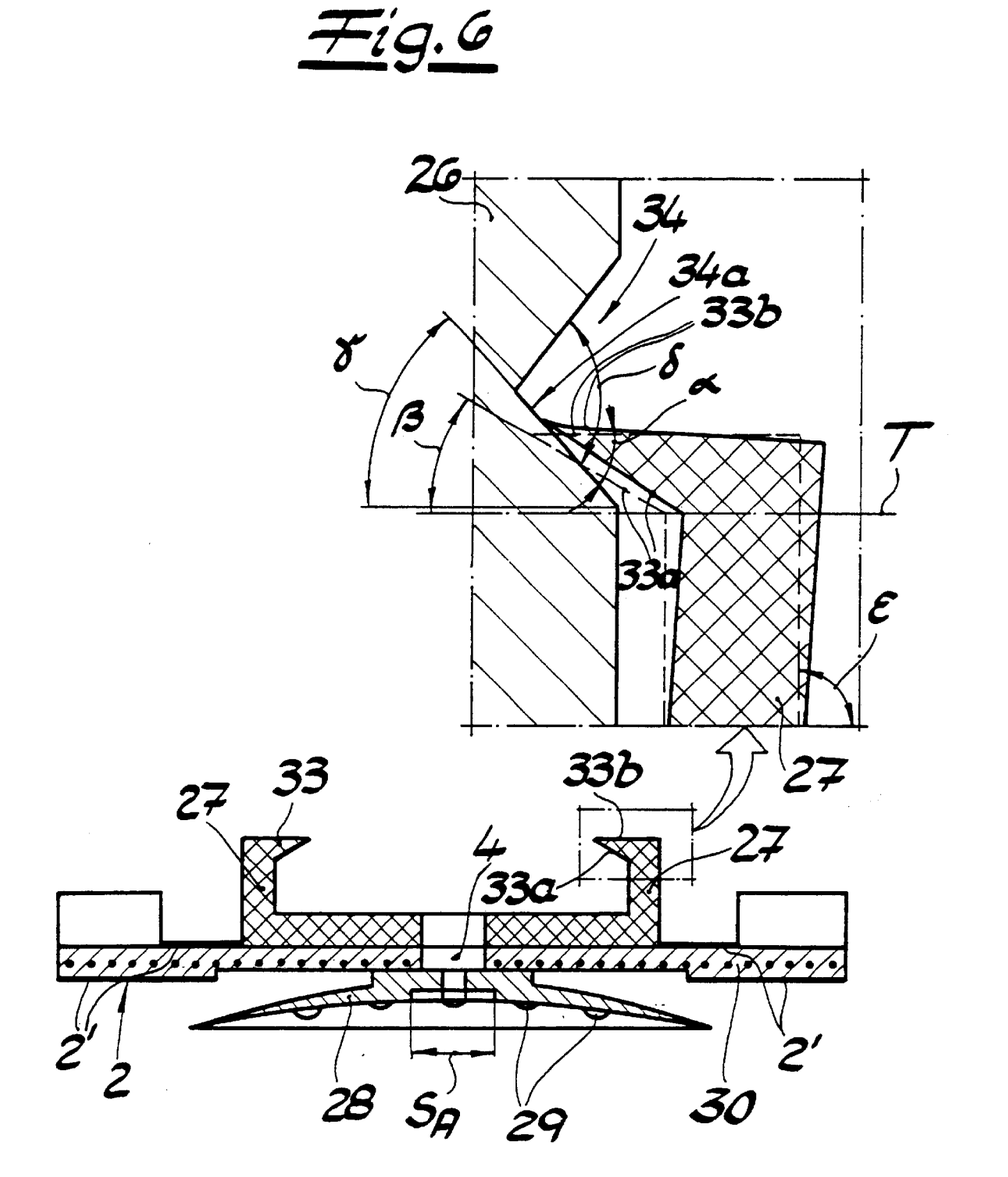
FIG. 6 shows an enlarged detail from FIGS. 1 to 3 and 5, which shows, in particular, the vacuum conveyor belt.

Otherwise, according to the exemplary embodiment in FIG. 5, the geometric relations in the case of the guide body 26 are selected in the same way as already described with reference to FIG. 6. The suction orifices 4 and the suction bores 35 or the vacuum duct 36 open into a suction line 54 which is arranged next to the magnetic device 3a and which is connected to the vacuum device 3b with movement play (see FIGS. 4 and 5). From the evidence of FIG. 8, this suction line 54 is itself connected to a vacuum limiting valve 37 which in each case is switched parallel to the suction bores 4 or to the suction line or suction lines 54. The suction lines 54 correspond essentially to the suction lines 22 in the embodiment according to FIGS. 1 to 3, so that the same applies accordingly to the suction lines 22.

Figure 8:
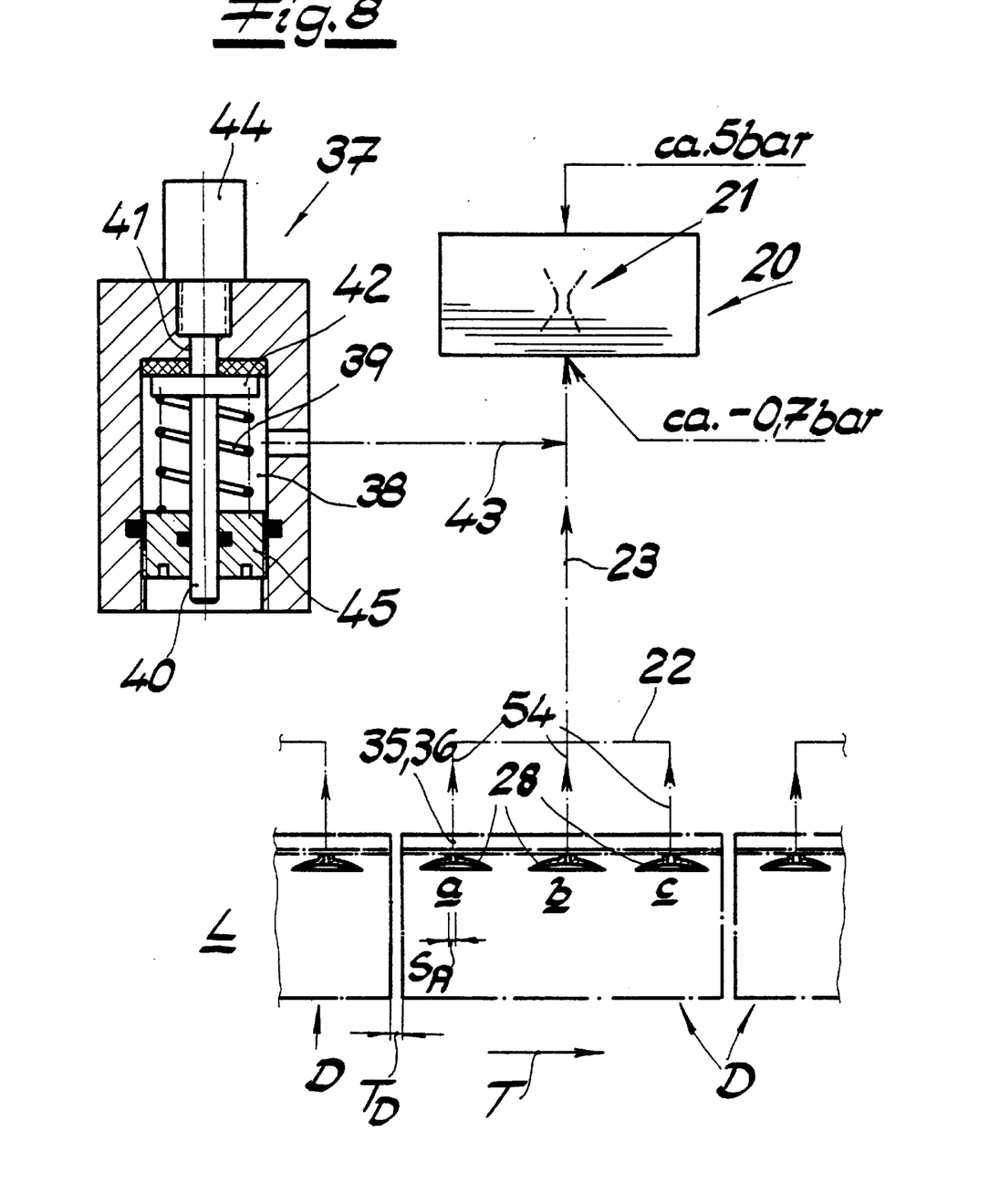
FIG. 8 shows a diagrammatic illustration of the vacuum limiting valve according to FIGS. 3, 4 and 5 in an enlarged view.

In this case, the suction lines 54 conventionally open into a common vacuum line 23 which merges into the vacuum device 20. In the alternative illustrated in FIG. 8, the vacuum limiting valve 37 is flanged to the vacuum line 23. Only one suction line 54, instead of the three shown in FIG. 8, is, of course, also conceivable.

At all events, in the plane of longitudinal extent L or longitudinal plane of the vacuum duct 36 (corresponding to the transport (plane) direction T), individual sections, each with two or more suction bores 35 with connected suction lines 22, are in each case connected to a vacuum source 20, so as to form respective suction modules D. Each suction module D has at least one vacuum limiting valve 37 vacuum-switched parallel to the suction bores 35 or suction lines 22, 54. It is ultimately important for the vacuum limiting valve 37 to be connected at any point to the vacuum system (suction lines 22, 54, vacuum line 23, suction bores 35 as well as vacuum duct 36 and suction orifices 4). According to the scenario illustrated in FIG. 8, three suction bores 35 with connected suction lines 22, 54 are provided for each suction module D, the vacuum limiting valve 37 in each case being switched parallel to the suction bore 35 or to the suction lines 22, 54. The suction lines 22, 54 conventionally open into a common vacuum line 23 which merges into the vacuum device 20.

In order to limit the vacuum, the vacuum limiting valve 37 opens at a predetermined vacuum threshold value in the vacuum duct 36 or the suction lines 22, 54. This (same) vacuum also prevails, of course, in the suction orifices 4 and the vacuum line 23 as well as the suction bores 35. When the vacuum limiting valve 37 opens if the above-mentioned vacuum threshold value is exceeded, the vacuum in the above-mentioned structural units is reduced, with the result that the vacuum conveyor belt 2 is no longer sucked up onto the guide body 26 to such a great extent.

In particular, for this purpose, the vacuum limiting valve 37 has a vacuum chamber 38 which is connected to the suction lines 22, 54 or to the common vacuum line 23 and which, spring-assisted, is shut off relative to atmospheric pressure by means of a valve disk 42 connected to a valve tappet 40 and closing a supply air orifice 41. A spring 39 having a predetermined or adjustable characteristic value serves for spring assistance.

The mode of functioning emerges from FIG. 8. The vacuum source 20 with a Venturi nozzle 21 is designated as a so-called "ejector". This ejector or the vacuum source 20 has compressed air of the order of magnitude of approximately 5 bar applied to it on the delivery side and, on the suction side, generates a vacuum of approximately −0.7 bar (see the corresponding arrows in FIG. 8). When the suction cup 28, designated by a and the foremost in the transport direction T, is closed by a sucked-up workpiece, then, a vacuum of approximately −0.12 bar is established in the vacuum system (suction orifice 4, vacuum duct 36, suction bore 35, suction lines 22, 54 and vacuum line 23), in contrast to the situation in the case of inactive suction cups, where the vacuum is approximately −0.05 bar. At all events, the above-mentioned vacuum of approximately −0.12 bar is sufficient to retain suspended workpieces reliably. The vacuum limiting valve 37, switched parallel to the suction lines 22 and set at approximately −0.15 bar, does not open.

When the second suction cup 28 (letter b) of the same suction module D is occupied by a workpiece, then, the vacuum in the above-mentioned system rises to approximately −0.27 bar. The result of this is that the vacuum limiting valve 37, set at approximately −0.15 bar, opens. That is to say, since the vacuum chamber 38 is connected to the vacuum line 23 via a vacuum line 43, the vacuum also rises correspondingly in the vacuum chamber 38 (namely to approximately −0.27 bar). The result of this is that, on account of the prevailing atmospheric pressure, the vacuum chamber 28, as it were, "contracts", that is to say the valve disk 42 is lifted off from the supply air orifice 41 counter to the force of the spring 39. At the same time, outside air flows into the vacuum chamber 38 via a filter 44 and, consequently, into the above-mentioned vacuum system via the vacuum line 43.

Without the parallel-connected vacuum limiting valve 37, even a vacuum of approximately −0.64 bar would occur in the system if the third suction cup 28 (letter c) were occupied. At all events, the vacuum limiting valve 37 ensures, altogether, that the vacuum conveyor belt 2 is not sucked up excessively by the vacuum duct 36 and, consequently, pressed against the guide body 26. The friction between the vacuum conveyor belt 2 and guide body 26 is therefore reduced as a whole, so that the advantages mentioned initially are afforded. It is, of course, possible to set the suction force, specifically, in the simplest case, by varying the prestress of the spring 39 by means of a merely indicated set-screw 45 within the vacuum chamber 38.

The suction orifices 4 in the vacuum conveyor belt 2 are conventionally dimensioned in such a way that their diameter is larger than the distance between the modules D, so that it is always ensured that a vacuum is applied to the associated suction cups 28. That is to say, if the diameter of the suction orifices 4 of the vacuum conveyor belt 2 is designated by $S_A$ and the distance between the suction modules D is designated by $T_D$, $S_A > T_D$ normally applies.

Finally, in the exemplary embodiment according to FIGS. 4 and 5, the guide body 26 together with the centering jaws 24 is designed in such a way that it has a transverse extent adapted to the width B of the vacuum conveyor belt 2, the guide body 26, centering jaws 24 and vacuum conveyor belt 2 being inserted with lateral play $S_p$ into the inner U-armature 57. Both the inner U-armature 57 and the outer U-armature 58 are designed as so-called steel poles, in light of the permanent magnet 59, and form a magnetic return, as indicated by the magnetic poles (S=South pole; N=North pole) which are formed and as described in detail in German patent application 197 24 634.6-22. Reference may also be made to DE-C-34 23 482 already mentioned. The permanent magnet 59 consists of strontium ferride or neodymium/iron/boron or is designed as an electromagnet.

What is claimed is:

1. An apparatus for the transport of workpieces (W), comprising
    at least one rotationally driven conveyor belt (1, 2) for the workpieces (W) to be laid onto the workpieces, and with a holding device (3), past which the conveyor belt (1, 2) is led, the holding device (3) retaining the workpieces (W) on the conveyor belt (1, 2) by a means selected from the group consisting of by means of a magnetic field passing through the conveyor belt (1, 2), by generating a vacuum at suction orifices (4) of the conveyor belt (1, 2), and by a combination of said magnetic field means and said vacuum generating means,
    wherein the holding device (3) has at least one magnetic device (3a) with a magnetic conveyor belt (1) and at least one vacuum device (3b) with a vacuum conveyor belt (2), said vacuum device being separated from said magnetic device, the vacuum device (3b), together with the respective conveyor belt (1, 2), being capable of being displaced relative to a common reference member (5) and of being brought into contact with the workpieces (W) to be transported,
    wherein the magnetic device (3a) has a hollow profiled strip (13) with main compressed air chambers (14) and a structural unit (15) connected on the transport side and having at least one permanent magnet (59) for generating a magnetic field and at least one electric compensating coil (59') for generating a temporary magnetic field and for compensating the permanent magnetic field.

2. The apparatus as claimed in claim 1, wherein the magnetic device (3a) and the vacuum device (3b) are jointly connected to a profiled holding strip (5) extending in the transport (plane) direction (T) and acting as a reference member (5), the profiled holding strip (5) having a basic carrier (5a) and a displacement carrier (5b), and the magnetic device (3a) being flanged to the basic carrier (5a) and the vacuum device (3b) being flanged to the displacement carrier (5b), said displacement carrier being movable, for this purpose, essentially vertically in relation to the transport (plane) direction (T).

3. The apparatus as claimed in claim 2, wherein the displacement carrier (5b) has a fastening plate (6) for the vacuum device (3b), said fastening plate sliding along the basic carrier (5a), and a bush (8) guided vertically in a bore (7) in the basic carrier (5a).

4. The apparatus as claimed in claim 3, wherein a roller (10) of U-shaped cross section, for riding an a tie rod (11) bearing between the U-legs and on the U-base, is connected coaxially to the bush (8), the tie rod (11) being designed to be displaceable in the transport (plane) direction (T) and having at least one run-on slope (5) for the vertical movement of the roller (10) and, consequently, of the displacement carrier (5b) during the actuation of the tie rod (11).

5. The apparatus as claimed in claim 1, wherein the vacuum device (3b) has a pressure guide strip (18) with secondary compressed air chambers (19) and at least one vacuum source (20) with a vacuum generator or vacuum generators (21), the vacuum source (20) being connected on the delivery side to the pressure guide strip (18) and on the suction side to the suction orifices (4).

6. The apparatus as claimed in claim 1, wherein the vacuum device (3b) is integrated into the magnetic device (3a) designed as a reference member (5) and is movable relative to the magnetic device (3a) in the direction of the workpieces (W).

7. The apparatus as claimed in claim 6, wherein the magnetic device (3a) is designed with a U-shaped cross section having a U-base and U-legs, at least two magnetic conveyor belts (1) being led, on the foot side, past the two respective U-legs, while the vacuum device (3b) together with the vacuum conveyor belt (2) is arranged along the longitudinal extent between the two magnetic conveyor belts (1).

8. The apparatus as claimed in claim 1, wherein the magnetic device (3a) is designed with a double-U-shaped cross section having an outer U-armature (58) with an outer armature base (58a) and outer armature legs (58b) and having an inner U-armature (57) with an inner armature base (57a) and inner armature legs (57b), the permanent magnet (59) being arranged between the two armature bases (58a, 57a), and the compensating coil (59') being placed in each case between inner and outer armature legs (57b, 58b).

9. The apparatus as claimed in claim 1, wherein the vacuum device (3b) has a connected adjusting device (55) for essentially vertical movement in the direction of the workpieces (W) and back again.

10. The apparatus as claimed in claim 1, wherein the adjusting device (55) is connected to the vacuum device (3b) on the head side and to the magnetic device (3a) on the foot side.

11. The apparatus as claimed in claim 1, wherein the vacuum device (3b) has, in cross section, a guide body (26) with suction bores (35) for the suction orifices (4) in the vacuum conveyor belt (2).

12. The apparatus as claimed in claim 1, wherein the suction bores (35) and the suction orifices (4) are arranged concentrically on a central axis (AC) of the vacuum device (3b), and, during the rotation of the vacuum conveyor belt (2), the suction orifices (4) in each case move on a plane of longitudinal extent (L) of a vacuum duct (36) which is connected to the suction bores (35) on the transport side for connecting these to one another.

13. The apparatus as claimed in claim 1, wherein the vacuum device (3b) has two valves, one valve being designed for applying pressure to the vacuum source (20), and the other valve, bypassing the vacuum source (20), being designed for applying pressure to the suction orifices (4).

14. The apparatus as claimed in claim 1, wherein the vacuum conveyor belt (2) engages, with rear sealing lips (27), into sealing gaps (DS) forming between centering jaws (24) located on both sides and the central guide body (26) and, if appropriate, possesses front-side suction cups (28).

15. The apparatus as claimed in claim 1, wherein individual sections, each with two or more suction bores (35) with connected suction lines (22, 54), are connected in each case to a vacuum source (20), so as to form respective suction modules (D).

16. The apparatus as claimed in claim 1, wherein at least one vacuum limiting valve (37) switched parallel to the suction lines (22, 54) is provided.

17. The apparatus as claimed in claim 1, wherein, in order to limit the vacuum, the vacuum limiting valve (37) opens at a predetermined vacuum threshold value in the suction lines (22, 54).

18. The apparatus as claimed in claim 1, wherein the vacuum limiting valve (37) has a vacuum chamber (38) which is connected to the suction line (22, 54) or to a common vacuum line (23) and which, spring-assisted, is shut off relative to atmospheric pressure by means of a valve disk (42) connected to a valve tappet (40) and closing a supply air orifice (41).

19. An apparatus for the transport of workpieces (W), comprising at least one rotationally driven conveyor belt (1, 2) for the workpieces (W) to be laid onto the workpieces, and with a holding device (3), past which the conveyor belt (1, 2) is led, the holding device (3) retaining the workpieces (W) on the conveyor belt (1, 2) by a means selected from the group consisting of by means of a magnetic field passing through the conveyor belt (1, 2), by generating a vacuum at suction orifices (4) of the conveyor belt (1, 2), and by a combination of said magnetic field means and said vacuum generating means, wherein the holding device (3) has at least one magnetic device (3a) with a magnetic conveyor belt (1) and at least one vacuum device (3b) with a vacuum conveyor belt (2), said vacuum device being integrated into said magnetic device and being movable relative to the magnetic device in the direction of the workpieces (W), the vacuum device (3b), together with the respective conveyor belt (1, 2), being capable of being displaced relative to a common reference member (5) and of being brought into contact with the workpieces (W) to be transported.

\* \* \* \* \*